US009137747B2

(12) United States Patent
Park et al.

(10) Patent No.: US 9,137,747 B2
(45) Date of Patent: Sep. 15, 2015

(54) METHOD AND APPARATUS FOR SELECTING A NODE IN A DISTRIBUTED MULTI-NODE SYSTEM

(75) Inventors: Sungho Park, Gyeonggi-do (KR); Jinyoung Chun, Gyeonggi-do (KR); Kitae Kim, Gyeonggi-do (KR); Sunam Kim, Gyeonggi-do (KR); Jiwon Kang, Gyeonggi-do (KR); Binchul Ihm, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 155 days.

(21) Appl. No.: 13/978,205

(22) PCT Filed: Jun. 3, 2011

(86) PCT No.: PCT/KR2011/004082
§ 371 (c)(1),
(2), (4) Date: Jul. 3, 2013

(87) PCT Pub. No.: WO2012/093759
PCT Pub. Date: Jul. 12, 2012

(65) Prior Publication Data
US 2013/0279362 A1    Oct. 24, 2013

Related U.S. Application Data

(60) Provisional application No. 61/429,724, filed on Jan. 4, 2011, provisional application No. 61/430,181, filed on Jan. 6, 2011.

(51) Int. Cl.
H04W 48/20   (2009.01)
H04W 24/02   (2009.01)
H04L 5/00    (2006.01)
H04W 88/08   (2009.01)

(52) U.S. Cl.
CPC .............. *H04W 48/20* (2013.01); *H04L 5/00* (2013.01); *H04W 24/02* (2013.01); *H04W 88/085* (2013.01)

(58) Field of Classification Search
None
See application file for complete search history.

(56) References Cited

U.S. PATENT DOCUMENTS

2007/0258366 A1    11/2007  Imamura
2008/0056181 A1    3/2008   Imamura et al.
2010/0074183 A1*   3/2010   Chen et al. ............... 370/328

(Continued)

OTHER PUBLICATIONS

International Search Report issued in corresponding International Patent Application No. PCT/KR2011/004082 dated Feb. 15, 2012.

*Primary Examiner* — Charles C Jiang
*Assistant Examiner* — George Atkins, Jr.
(74) *Attorney, Agent, or Firm* — Morgan, Lewis & Bockius LLP (57) ABSTRACT

This specification relates to a method for selecting a node in a serving cell in a distributed multi-node system, the method being characterized by comprising the steps of: receiving a channel state information reference signal of each node in the serving cell from a base station; measuring a signal intensity or interference level about the respective nodes through the received channel state information reference signal; and determining at least one valid node from among the respective nodes based on the measured result, wherein the signal intensity or the interference level is expressed in any one of channel state information reference signal received power (CSI-RSRP), channel state information reference signal received quality (CSI-RSRQ), and channel state information reference signal's signal intensity (CSI-RSSI).

9 Claims, 6 Drawing Sheets (56) References Cited

U.S. PATENT DOCUMENTS

2010/0238883 A1\* 9/2010 Borran et al. ............... 370/329
2010/0329180 A1 12/2010 Rao et al.
2011/0034175 A1\* 2/2011 Fong et al. ............... 455/450
2011/0170496 A1\* 7/2011 Fong et al. ............... 370/329
2012/0195264 A1\* 8/2012 Taoka et al. ............... 370/328
2013/0083722 A1\* 4/2013 Bhargava et al. ............. 370/315

\* cited by examiner

METHOD AND APPARATUS FOR SELECTING A NODE IN A DISTRIBUTED MULTI-NODE SYSTEM

This is a U.S. National Phase Entry of PCT Application No. PCT/KR2011/004082, filed Jun. 3, 2011, and claims the benefit of U.S. Provisional Application Nos. 61/430,181 and 61/429,724 filed Jan. 6, 2011 and Jan. 4, 2011, respectively.

TECHNICAL FIELD

The present invention relates to a distributed multi-node system (DMNS), and more particularly, to a method and an apparatus for selecting valid nodes among nodes in a serving cell.

BACKGROUND ART

In a current wireless communication environment, with appearance and spread of various devices such as a smart phone and a tablet PC that require a machine-to-machine (M2M) communication and a large amount of data transmission, data requirements for a cellular network are very rapidly increasing.

In order to satisfy large data requirements, a communication technology is developed into a carrier aggregation technology and a cognitive radio technology for efficiently using more frequency bands and a multi-antenna technology and a multi-base station cooperative technology for increasing data capacity in a limited frequency. In addition, a communication environment evolves so that density of accessible nodes around a user is increased.

A system having the high density nodes may have higher system performance by cooperation among the nodes. Such a system has higher performance than that in which nodes operate as independent base stations (for example, a base station (BS), an advanced BS (ABS), a node B (NB), an eNode B (eNB), and an access point (AP)) that do not cooperate with each other.

DISCLOSURE

Technical Problem

An object of the present invention is to provide a method of measuring channel state information reference signal received power (CSI-RSRP), channel state information reference signal received quality (CSI-RSRQ), and channel state information reference signal's signal intensity (CSI-RSSI) for nodes in a serving cell using a channel state information reference signal (CSI-RS) in a distributed multi-node system (DMNS) to select and feedback valid nodes that are preferred by a terminal or that may be used by the terminal.

In addition, another object of the present invention is to provide a method of calculating a received reference signal to interference plus noise ratio (RxRSINR) through CSI-RSRP, CSI-RSRQ, and CSI-RSSI for nodes in a serving cell that are measured using a CSI-RS in a DMNS to select and feedback valid nodes that are preferred by a terminal or that may be used by the terminal.

Technical Solution

According to the present invention, there is provided a method of selecting nodes in a serving cell in a distributed multi-node system (DMNS), including receiving channel state information reference signals (CSI-RS) for nodes in the serving cell from a base station (BS), measuring signal intensities or interference levels for the nodes through the received CSI-RSs, and determining at least one valid node among the nodes based on the measurement results. The signal intensities or the interference levels are expressed as one of channel state information reference signal received power (CSI-RSRP), channel state information reference signal received quality (CSI-RSRQ), and channel state information reference signal's signal intensity (CSI-RSSI).

The method further includes feeding back valid node information on the determined valid nodes or the measurement results to the BS.

The valid node information further includes valid node number information that represents the number of determined valid nodes and the number of valid nodes is a value in a uniform range.

The uniform range is between a lower bound and an upper bound of the number of valid nodes that may be served to a terminal and the lower bound and the upper bound are values transmitted by the BS or previously defined values.

The valid node information includes at least one of physical node indices, logic node indices, CSI-RS port numbers, CSI-RSRP, CSI-RSRQ, and CSI-RS configurations, a CSI-RS sub-frame configuration, and a cell ID.

Determining the valid nodes includes comparing the signal intensities or the interference levels of the nodes with a threshold value as a reference for selecting valid nodes and determining nodes having signal intensities or interference levels larger or smaller than the threshold value as valid nodes.

Determining the valid nodes includes comparing a difference between a signal intensity or an interference level of a node among the nodes and signal intensities or interference levels of remaining nodes with a threshold value as a reference for selecting the valid nodes and determining at least one node having a smaller value than the threshold value as a valid node so that the node has the largest signal intensity or interference level.

In determining the valid nodes, when the sum of signal intensities or interference levels of a specific node group among the nodes is in a uniform range, nodes that belong to the specific node group are determined as the valid nodes.

The threshold value or the uniform range is a value transmitted through the BS or a network or a predetermined value.

Determining the valid nodes further includes calculating a received reference signal to interference plus noise ratio (RxRSINR) based on the signal intensities or the interference levels measured for the nodes. The RxRSINR is defined as the sum of reference signal received powers of selected nodes in the serving cell and the sum of interference of non-selected nodes in the serving cell and stream noise.

The RxRSINR is calculated based on a combination of the nodes in the serving cell.

In determining the valid nodes, nodes in which the calculated RxRSINR belongs to a uniform range are determined as the valid nodes and the uniform range is between a lower bound and an upper bound transmitted by the BS or a network.

There is provided a terminal for selecting nodes in a serving cell in a distributed multi-node system (DMNS), including a radio frequency (RF) unit for transmitting a radio signal to and receiving a radio signal from an outside and a controller connected to the RF unit. The controller controls the RF unit to receive CSI-RSs for the nodes in the serving cell from a BS, measures signal intensities or interference levels for the nodes through the received CSI-RSs, and performs control so that at least one valid node is determined among the nodes.

The signal intensities or the interference levels are expressed as one of channel state information reference signal received power (CSI-RSRP), channel state information reference signal received quality (CSI-RSRQ), and channel state information reference signal's signal intensity (CSI-RSSI).

There is provided a method of selecting nodes in a serving cell in a distributed multi-node system (DMNS), including transmitting CSI-RSs for nodes in the serving cell to terminal, receiving measurement results of signal intensities or interference levels for the nodes from the terminal, and determining at least one valid node among the nodes based on the received measurement results.

The method further includes transmitting valid node information on the determined valid nodes to the terminal.

Advantageous Effects

According to the present invention, in the DMNS, the CSI-RSRP, the CSI-RSRQ, and the CSI-RSSI measured through the CSI-RS and the RxRSINR are used so that services may be provided by nodes that are preferred by a terminal and that may be used by the terminal among a number of nodes in a serving cell and signaling processes for the nodes in the serving cell may be reduced.

BEST MODE

Hereinafter, embodiments of the present invention will be described in detail with reference to the accompanying drawings. In the following description, only parts required for understanding operations according to the present invention are described and description of the other parts will be omitted so as not to blur the subject matter of the present invention.

The following embodiments are obtained by combining elements and characteristics of the present invention with each other in a predetermined manner. The elements and characteristics should be considered to be selective unless otherwise stated. The elements or characteristics may not be combined with other elements or characteristics. In addition, the embodiments of the present invention may be configured by combining partial elements and/or characteristics. The order of operations described in the embodiments of the present invention may be changed. Partial elements or characteristics of a certain embodiment may be included in another embodiment and may be exchanged with corresponding elements or characteristics of the other embodiment.

In the present invention, embodiments are described based on data transmission and reception between a base station (BS) and a terminal. Here, the BS functions as a terminal node of a network that directly communicates with the terminal. A specific operation described to be performed by the BS may be performed by an upper node of the BS.

That is, it is apparent that various operations performed by the network configured by a plurality of network nodes including the BS to communicate with the terminal may be performed by the BS or other network nodes than the BS. The BS may be replaced by the terms a fixed station, a node B, an eNode B (eNB), and an access point LAP). In addition, the terminal may be replaced by the terms user equipment (UE), a mobile station (MS), and a mobile subscriber station (MSS).

The embodiments of the present invention may be realized through various units. For example, the embodiments of the present invention may be realized by hardware, firmware, software, or a combination of the hardware, the firmware, and the software.

When the embodiments are realized by the hardware, a method according to the embodiments of the present invention may be realized by one or more application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

When the embodiments are realized by the firmware or the software, a method according to the embodiments of the present invention may be realized in the form of a module, a process, or a function that performs the above-described functions or operations. A software code may be stored in a memory unit to be driven by a processor. The memory unit may be positioned in or outside the processor to transmit data to or receive data from the processor by well-known various units.

Specific terms used hereinafter are provided to facilitate understanding of the present invention and it may be understood by those skilled in the art that various modifications or variations may be made to the present invention without departing from the scope of the present invention.

Hereinafter, a distributed multi-node system (DMNS) will be simply described.

Distributed Multi-Node System (DMNS)

Figure 1:
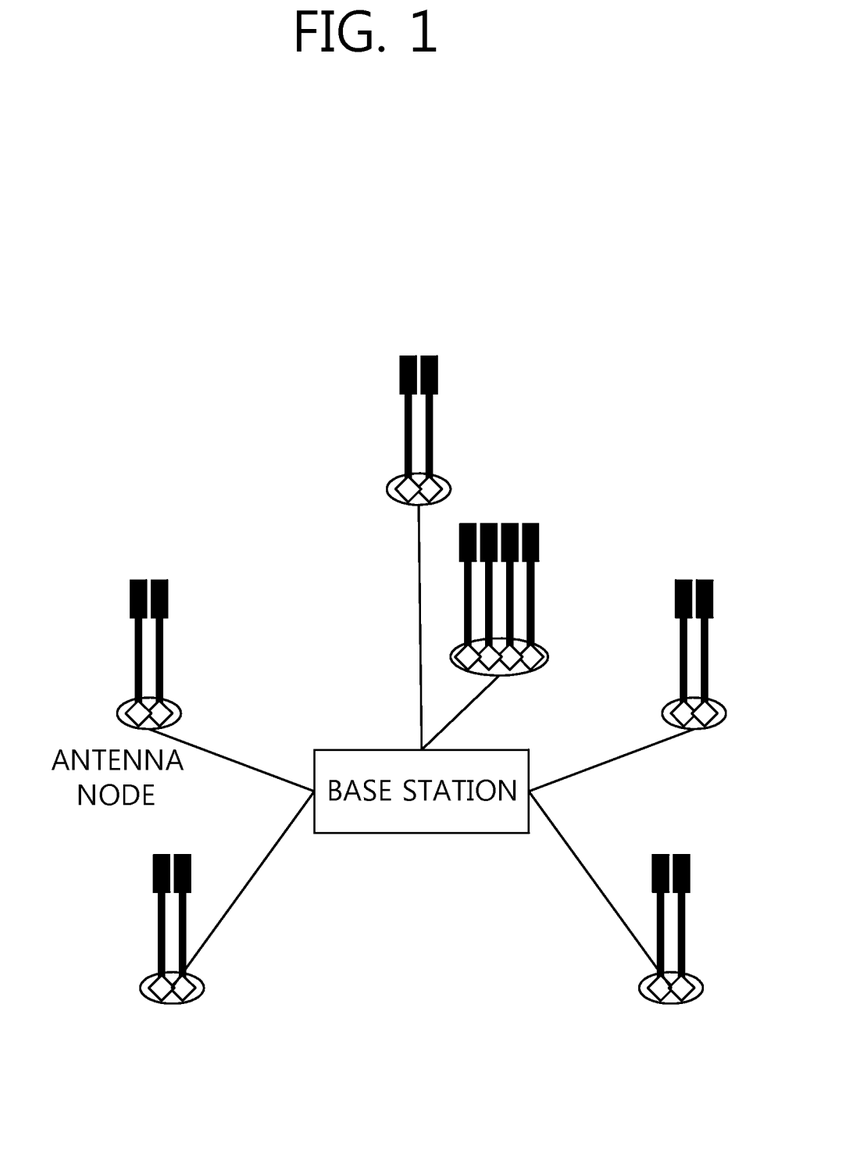
FIGS. 1 and 2 are conceptual diagrams illustrating a distributed multi-node system (DMNS) according to an embodiment of the present invention.
Figure 2:
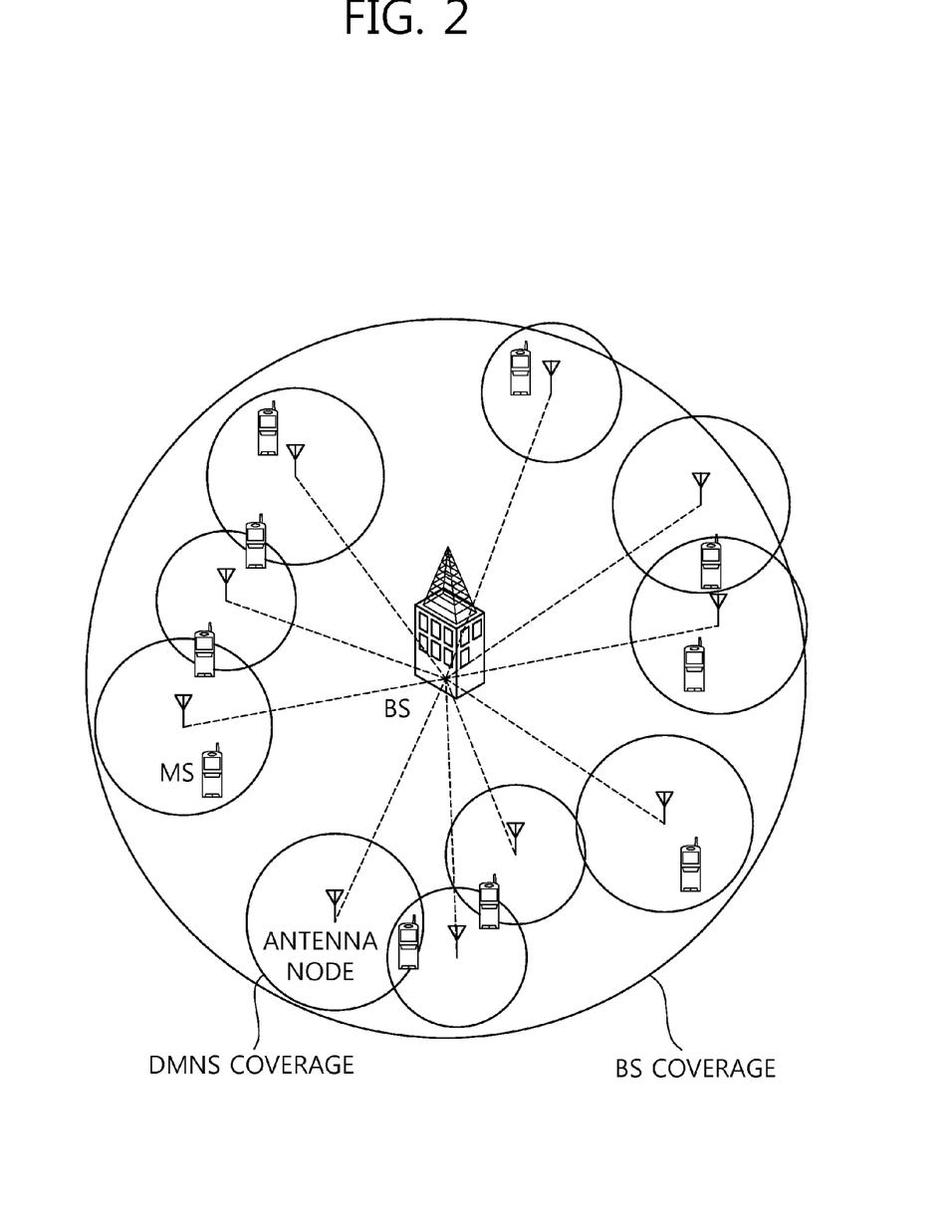

FIGS. 1 and 2 are conceptual diagrams illustrating a distributed multi-node system (DMNS) according to an embodiment of the present invention.

As illustrated in FIGS. 1 and 2, the DMNS may be configured by a base station (BS) and at least one antenna node.

In the DMNS, unlike in a centralized antenna system (CAS) where BS (a BS, a BTS, a node-B, and an eNode B) antennas are in a center of a cell, antenna nodes (or nodes) located in various positions of a cell are managed by a single BS.

The antenna nodes are wiredly or wirelessly connected to the BS and each may include at least one antenna. In general, antennas that belong to one antenna node belong to the same spot such that a distance between the closest antennas is within several meters. The antenna node functions as an access point (AP) that a terminal may access.

Here, the antenna node may be a group of antenna elements located in the same area. That is, the CAS may have one antenna node and the DMNS may have at least one antenna node.

In addition, the antenna node may be replaced by the terms a node, an antenna port (or element) group, an antenna port, a distributed antenna unit (DA), an antenna group, an antenna cluster, a BS (a BS, a node B, and an eNode B), a pico-cell eNB (PeNB), a home eNB (HeNB), an RRH, a relay, and a repeater.

Referring to FIGS. 1 and 2, transmission and reception of all the antenna nodes are managed by one controller so that each of the antenna nodes may operate as a partial antenna group of a cell. At this time, each of the antenna nodes may receive a node identifier (ID) and may operate as a partial antenna group in a cell without an additional node ID.

In addition, when each of the antenna nodes has a cell ID and performs scheduling and handover, it may be considered as a multi-cell (for example, macro-cell/femto-cell/pico-cell) system.

In addition, when multi-cells are overlaid in accordance with coverage, it is referred to as a multi-tier network.

Hereinafter, a common reference signal (CRS) and a channel state information (or indication) reference signal (CSI-RS) will be simply described.

Common Reference Signal (CRS)

A CRS used for estimating a channel of a physical antenna end may be commonly received by all UEs in a cell and are distributed in an entire band. The CRS may be used for obtaining channel state information (CSI) and demodulating data.

Various CRSs are defined in accordance with an antenna configuration of a transmission side (the BS). A 3GPP LTE (release-8) system supports various antenna configurations. A downlink signal transmission side (the BS) includes three kinds of antennas such as a single antenna, two transmission antennas, and four transmission antennas. When the BS performs single antenna transmission, a reference signal for a single antenna port is arranged. When the BS performs two antenna transmission, reference signals for two antenna ports are arranged in a time division multiplexing (TDM) method and/or a frequency division multiplexing (FDM) method. That is, the reference signals for the two antenna ports are arranged in different time resources and/or different frequency resources to be distinguished from each other. In addition, when the BS performs four antenna transmission, reference signals for four antenna ports are arranged in the TDM method and/or FDM method. Channel information estimated by a downlink signal reception side (the terminal) through the CRS may be used for demodulating data transmitted in transmission techniques such as single antenna transmission, transmit diversity, closed-loop spatial multiplexing, open-loop spatial multiplexing, and multi-user multiple-input and multiple-output (MIMO) (MU-MIMO).

In a case where a multi-antenna is supported, when a reference signal is transmitted by a certain antenna port, the reference signal is transmitted to a designated resource element (RE) position in accordance with a reference signal pattern and no signal is transmitted to an RE position designated for another antenna port.

In order to improve channel estimation performance through the CRS, a position of the CRS of each cell in a frequency region may be shifted to vary. For example, when the reference signal is located every three subcarriers, the reference signal may be arranged on a subcarrier of 3k and anther cell may be arranged on a subcarrier of 3k+1. In one antenna port, the reference signal is arranged at six RE intervals (that is, six subcarrier intervals) in the frequency region and three RE intervals are maintained in the frequency region with an RE in which a reference signal for another antenna port is arranged.

In addition, the CRS is differently arranged in accordance with a length of a cyclic prefix (CP) (a normal CP and an extended CP).

Channel State Information Reference Signal (CSI-RS)

In comparison with a system having a conventional antenna configuration (for example, the LTE release-8 system that supports the four transmission antennas), in a system having an extended antenna configuration (for example, an LTE-A system that supports eight transmission antennas), transmission of a new reference signal for obtaining channel state information (CSI) is required.

In comparison with channel information required for demodulating data, in channel information for obtaining the CSI, although a degree of accuracy of channel estimation through a reference signal is relatively low, it is enough to obtain the CSI. Therefore, a CSI-RS designed to obtain the CSI may be designed to have lower density than that of a conventional reference signal. For example, the CSI-RS may be transmitted in a duty cycle such as 2 ms, 5 ms, 10 ms, and 40 ms at time and an RS may be transmitted at six RE intervals or at 12 RE intervals in a frequency. Here, the duty cycle means a time unit at which all reference signals for antenna ports used for transmission may be obtained. In addition, the CSI-RS may be transmitted in an entire band of a frequency.

In order to reduce overhead of the CSI-RS transmitted in one sub-frame, reference signals for antenna ports may be transmitted in different sub-frames. The CSI-RS that may support all the antenna ports in accordance with transmission antennas extended in the duty cycle must be transmitted.

Hereinafter, the CSI-RS will be described in more detail.

1. Multiple Configuration

Unlike the CRS, the CSI-RS includes a hetero-network (HetNet) environment and up to 32 different configurations are suggested in order to reduce inter-cell interference (ICI) in a multi-cell environment.

The configurations of the CSI-RS vary with the number of antenna ports in a cell and adjacent cells are configured to have different configurations. In addition, the configurations are distinguished from each other in accordance with a cyclic prefix (CP) type and are divided into configurations applied to both FS1 and FS2 and configurations that support only the FS2 in accordance with a frame structure (FS) type. Finally, unlike the CRS, the CSI-RS supports up to eight ports (p=15, p=15 and 16, p=15, . . . , and 18, and p=15, . . . , and 22) and is defined only for $\Delta f=15$ kHz.

TABLE 1 illustrates an example of CSI-RS configuration for the normal CP.

TABLE 1

| | CSI reference signal Configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |

TABLE 1-continued

| | CSI reference signal Configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| frame | 20 | (11, 1) | 1 | | | | |
| structure | 21 | (9, 1) | 1 | | | | |
| type 2 | 22 | (7, 1) | 1 | | | | |
| only | 23 | (10, 1) | 1 | | | | |
| | 24 | (8, 1) | 1 | | | | |
| | 25 | (6, 1) | 1 | | | | |
| | 26 | (5, 1) | 1 | | | | |
| | 27 | (5, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2 illustrates an example of CSI-RS configuration for the extended CP.

TABLE 2

| | CSI reference signal Configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| frame | 0 | (11, 4) | 0 | (9, 5) | 0 | (9, 5) | 0 |
| structure | 1 | (9, 4) | 0 | (11, 2) | 0 | (11, 2) | 0 |
| type 1 | 2 | (10, 4) | 1 | (9, 2) | 1 | (9, 2) | 1 |
| and 2 | 3 | (9, 4) | 1 | (7, 2) | 1 | (7, 2) | 1 |
| | 4 | (5, 4) | 0 | (9, 5) | 0 | (9, 5) | |
| | 5 | (3, 4) | 0 | (8, 5) | 0 | | |
| | 6 | (4, 4) | 1 | (10, 2) | 1 | | |
| | 7 | (3, 4) | 1 | (8, 2) | 1 | | |
| | 8 | (8, 8) | 0 | (6, 2) | | | |
| | 9 | (6, 4) | 0 | (8, 5) | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| frame | 20 | (4, 1) | 1 | (4, 1) | 1 | | |
| structure | 21 | (3, 1) | 1 | (3, 1) | 1 | | |
| type 2 | 22 | (8, 1) | 1 | | | | |
| only | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

2. Resource Mapping

In a sub-frame configured for CSI-RS transmission, an RS sequence $r_{l,n_s}(m)$ is mapped to a complex-valued modulation symbol $a_{k,l}^{(p)}$ used as a reference symbol for an antenna port p in accordance with EQUATION 1.

$$a_{k,l}^{(p)} = w_{l''} \cdot r(m)$$ [EQUATION 1]

wherein, $$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

The CSI-RS of the multiple configuration may be used in a provided cell.

First, in a case of a non-zero power CSI-RS where power is not 0, a BS transmits only a CSI-RS for one configuration to a terminal.

In addition, in a case of a zero power CSI-RS where power is 0, the BS may transmit the CSI-RS of the multiple configuration to the terminal. In addition, the BS may not transmit the CSI-RS to the terminal.

Here, the BS does not transmit the CSI-RS in the following cases.
1) in a specific sub-frame of FS2
2) when the CSI-RS conflicts with synchronization signals, PBCH, or a system information block (SIB)
3) in a sub-frame to which a paging message is transmitted In an RE (k,l) used for transmitting the CSI-RS in a certain place of an antenna port in a set S, no antenna port is used for transmitting PDSCH in the same slot and no antenna port excluding elements of the set S in the same slot is used for the CSI-RS.

3. Sub-Frame Configuration

The CSI-RS supports five duty cycles in accordance with CQI/CSI feedbacks and may be transmitted with different sub-frame offsets in cells.

(1) cell-specific sub-frame configuration period: $T_{CS-RS}$
(2) cell-specific sub-frame offset: $\Delta_{CSI-RS}$
(3) CSI-RS-SubframeConfig: provided by higher layer
(4) A sub-frame including the CSI-RS must satisfy EQUATION 2.

$$(10 n_f + \lfloor n_s/2 \rfloor - \Delta_{CSI-RS}) \bmod T_{CSI-RS} = 0$$ [EQUATION 2]

TABLE 3 illustrates an example of a CSI-RS sub-frame configuration related to a duty cycle.

TABLE 3

| CSI-RS-SubframeConfig $I_{CSI-RS}$ | CSI-RS periodicity $T_{CSI-RS}$ | CSI-RS subframe offset $\Delta_{CSI-RS}$ |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

4. Sequence Generation

A sequence $r_{l,n_s}(m)$ for the CSI-RS is generated as illustrated in EQUATION 3.

$$r_{l,n_s}(m) = \frac{1}{\sqrt{2}}(1 - 2 \cdot c(2m)) + j \frac{1}{\sqrt{2}}(1 - 2 \cdot c(2m+1)),$$ [EQUATION 3]

$$m = 0, \ldots, N_{RB}^{max,DL} - 1$$

5. Definition of CSI-RS

CSI-RS related parameters are cell-specific and are configured through higher layer signaling.
(1) the number of CSI-RS ports
(2) CSI-RS configuration
(3) CSI-RS sub-frame configuration ($I_{CSI-RS}$)
(4) sub-frame configuration period ($T_{CSI-RS}$)
(5) sub-frame offset ($\Delta_{CSI-RS}$)

A terminal estimates reference PDSCH transmission power for the CSI feedback $P_C$.

$P_C$ is an estimation ratio of PDSCH EPRE and CSI-RS EPRE when the terminal performs the CSI feedback and has a value of 1 dB interval magnitude in a range of [−8, 15] dB.

Here, an energy per resource element (EPRE) represents energy or transmission power for a resource element to which one reference symbol or data symbol is mapped.

TABLE 4 is an example illustrating the number of intra-cell CSI-RS configurations in accordance with a CP type, a frame structure type, and the number of antenna ports in LTE-A Rel-10.

TABLE 4

| | | Number of CSI-RS configurations | | |
|---|---|---|---|---|
| CP Type | Frame Structure | 2 ports CSI_RS | 4 ports CSI_RS | 8 ports CSI_RS |
| Normal CP | Type1&2 | 20 | 10 | 5 |
| | Type2 | 12 | 6 | 3 |
| | Total | 32 | 16 | 8 |
| Extended CP | Type1&2 | 16 | 8 | 4 |
| | Type2 | 12 | 6 | 3 |
| | Total | 28 | 14 | 7 |

Hereinafter, a method of determining (selecting or detecting) valid nodes in a serving cell using the CSI-RS in the DMNS according to the present invention will be described.

First Embodiment

In a first embodiment, there is provided a method of measuring signal intensities or noise levels for nodes in a serving cell using a CSI-RS in a DMNS to determine valid nodes that may be received by a terminal or that are preferred by the terminal, and there is provided a method of feeding back information on the valid nodes.

Definitions of CSI-RSRP, CSI-RSRQ, and CSI-RSSI

First, channel state information reference signal received power (CSI-RSRP), channel state information reference signal received quality (CSI-RSRQ), and channel state information reference signal strength indication (CSI-RSSI) used for determining valid nodes in the present invention are defined as follows. Here, the CSI-RSRP, the CSI-RSRQ, and the CSI-RSSI represent RSRP, RSRQ, and RSSI measured through the CSI-RS.

The CSI-RSRP is defined as a linear average of power contributions of REs that transmit CSI-RSs in a considered measured frequency band. The CSI-RSRP mapped to each of the nodes is used for determining the CSI-RSRP of each of the nodes.

In addition, a reference point of the CSI-RSRP may be an antenna connector of the terminal.

When the terminal uses receive diversity, a reported value is no less than a corresponding CSI-RSRP of a specific branch among diversity branches.

Next, the CSI-RSRQ is defined as a ratio of N×CSI-RSRP/E-UTRA carrier CSI-RSSI. Here, N represents the number of resource blocks of an E-UTRA carrier CSI-RSSI measured bandwidth.

Measurement of values corresponding to a numerator and a denominator are performed on the same set of the resource blocks.

Next, E-UTRA carrier CSI-RSSI is configured by a linear average of entire received power observed only by an OFDM symbol including the CSI-RS in the measured bandwidth.

A reference point of the CSI-RSRQ may be an antenna connector of the terminal.

In addition, when the terminal uses receive diversity, a reported value is no less than a corresponding CSI-RSRQ of a specific branch among diversity branches.

Figure 3:
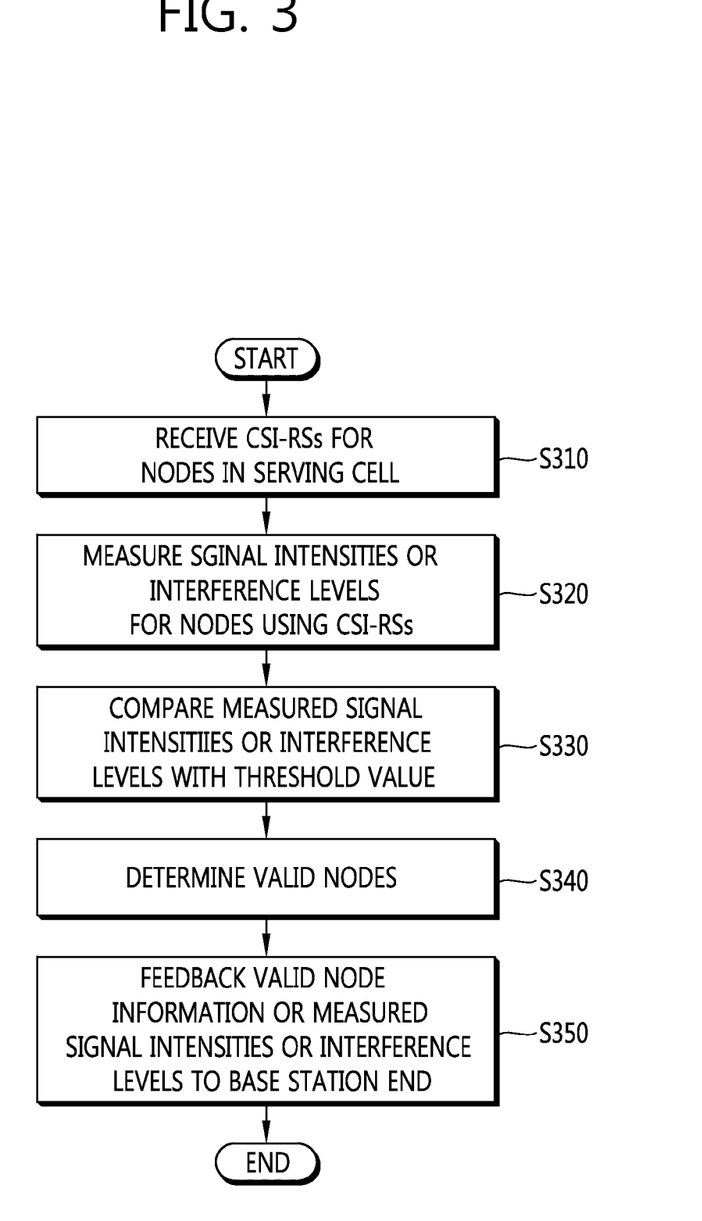
FIG. 3 is a flowchart illustrating a method of selecting valid nodes according to a first embodiment of the present invention.

FIG. 3 is a flowchart illustrating a method of selecting valid nodes according to a first embodiment of the present invention.

First, in a DMNS, a terminal receives CSI-RSs for nodes in a serving cell from the BS (or the nodes) S310.

Then, the terminal measures signal intensities or interference levels for the nodes through the received CSI-RSs S320. Here, the signal intensities or the interference levels may be expressed as CSI-RSRP, CSI-RSRQ, and CSI-RSSI. Here, the interference level may be a signal to interference plus noise ratio (SINR).

Then, the terminal may determine valid nodes among the nodes in the serving cell using measurement results of the signal intensities or the interference levels of the nodes through the following methods 1 to 4 S330 to S340.

Determination of Valid Nodes

Hereinafter, when a signal intensity or an interference level (CSI-RSRP, CSI-RSRQ, and CSI-RSSI) of an mth node measured by the terminal is represented as $Q_m$ and the signal intensities or the interference levels of the nodes are aligned in a descending order, the $Q_m$ is represented as $P_k$. That is, the signal intensities or the interference levels of the nodes may be expressed as $P_1 \geq P_2 \geq \ldots \geq P_k$.

Method 1

In a method 1, the valid nodes are determined by comparing the signal intensities of the nodes with a threshold value $threshold_0$.

That is, the terminal determines nodes that satisfy EQUATION 4 as valid nodes.

$$P_k \geq threshold_0 \quad \text{[EQUATION 4]}$$

The terminal may not select nodes that satisfy EQUATION 5 as valid nodes.

$$P_k \leq threshold_0 \quad \text{[EQUATION 5]}$$

Method 2

In a method 2, the terminal determines valid nodes by comparing a difference in signal intensities or interference levels between continuous nodes with a threshold value $threshold_1$.

That is, the terminal selects nodes corresponding to $P_1$ to $P_k$ ($P_1, P_2, \ldots, P_k^*$) as valid nodes for $k=k^*$ that first satisfies EQUATIONS 6 and 7. Here, k increases by one from 1 until the EQUATIONS 6 and 7 are satisfied.

$$(P_k - P_{k+1}) \geq threshold_1 \quad \text{[EQUATION 6]}$$

$$P_k/P_{k+1} \geq threshold_1 \quad \text{[EQUATION 7]}$$

Method 3

In a method 3, the terminal determines valid nodes by comparing a difference in signal intensities or interference levels between a node having the largest signal intensity or interference level and the other nodes with a threshold value $threshold_2$. That is, the terminal determines nodes in which the difference in the signal intensities or the interference levels is smaller than $threshold_2$.

That is, the terminal selects the node (for example, $P_1$) having the largest signal intensity or interference level (for example, CSI-RSRP, CSI-RSRQ, and CSI-RSSI) to determine all the nodes corresponding to $P_k$ that satisfies EQUATIONS 8 and 9 as valid nodes.

$$(P_1 - P_{k(>1)}) \leq threshold_2 \quad \text{[EQUATION 8]}$$

$$P_1/P_{k(>1)} \leq threshold_2 \quad \text{[EQUATION 9]}$$

Method 4

In a method 4, the terminal compares the sum of signal intensities or interference levels of a specific node group with a threshold value to determine nodes that belong to the specific node group as valid nodes. The specific node group refers to a sub-set of the nodes of the serving cell in the DMNS.

That is, the terminal determines nodes (that is, nodes corresponding to $P_1$ to $P_k$) in a node group corresponding to $S_k$ that satisfies EQUATION 10 as valid nodes.

$$threshold_3 \leq S_k \leq threshold_4 \quad \text{[EQUATION 10]}$$

$$\text{wherein, } S_k = \sum_{i=1}^{k} P_i.$$

The threshold values $threshold_0$, $threshold_1$, $threshold_2$, $threshold_3$, and $threshold_4$ in the methods 1 to 4 may be values transmitted from the BS or a network to the terminal or may be predetermined values.

Then, the terminal may feedback information on the determined valid nodes, that is, valid node information or the measurement results of the signal intensities or the interference levels of the nodes to the BS S350.

Here, when the terminal feeds back the measurement results of the signal intensities or the interference levels of the nodes to the BS, the BS may determine the valid nodes using the results fed back by the terminal and may transmit the information on the determined valid nodes to the terminal.

In addition, the valid node information further includes valid node number information that represents the number of determined valid nodes. Here, the number of valid nodes may be a value in a uniform range as follows. In addition, the uniform range may be a predetermined value or a value transmitted by the BS.

That is, the number N of valid nodes selected by the terminal to be fed back to the BS must satisfy the following conditions.

$$N_1 \leq N \leq N_2$$

wherein, $N_1$ and $N_2$ represent a lower bound and an upper bound of the number of nodes that may be selected by the terminals, respectively.

In addition, $N_1$ may be previously defined to be applied without being additionally transmitted by the BS or $N_1$ and $N_2$ may be previously defined as the same value and only one value may be provided to the terminal.

In addition, the valid node information includes at least one of physical node indices, logic node indices, CSI-RS port numbers, CSI-RSRP, CSI-RSRQ, and CSI-RS configurations, a CSI-RS sub-frame configuration, and a cell ID. Here, the logic node indices may represent indices of the nodes corresponding to the signal intensities or the interference levels when the signal intensities or the interference levels measured by the terminal are aligned in a descending order.

Second Embodiment

In a second embodiment, there is provided a method of calculating an RxRSINR based on signal intensities or noise levels of nodes measured through the CSI-RS in a DMNS to determine valid nodes that may be received by a terminal or that are preferred by the terminal.

Figure 4:
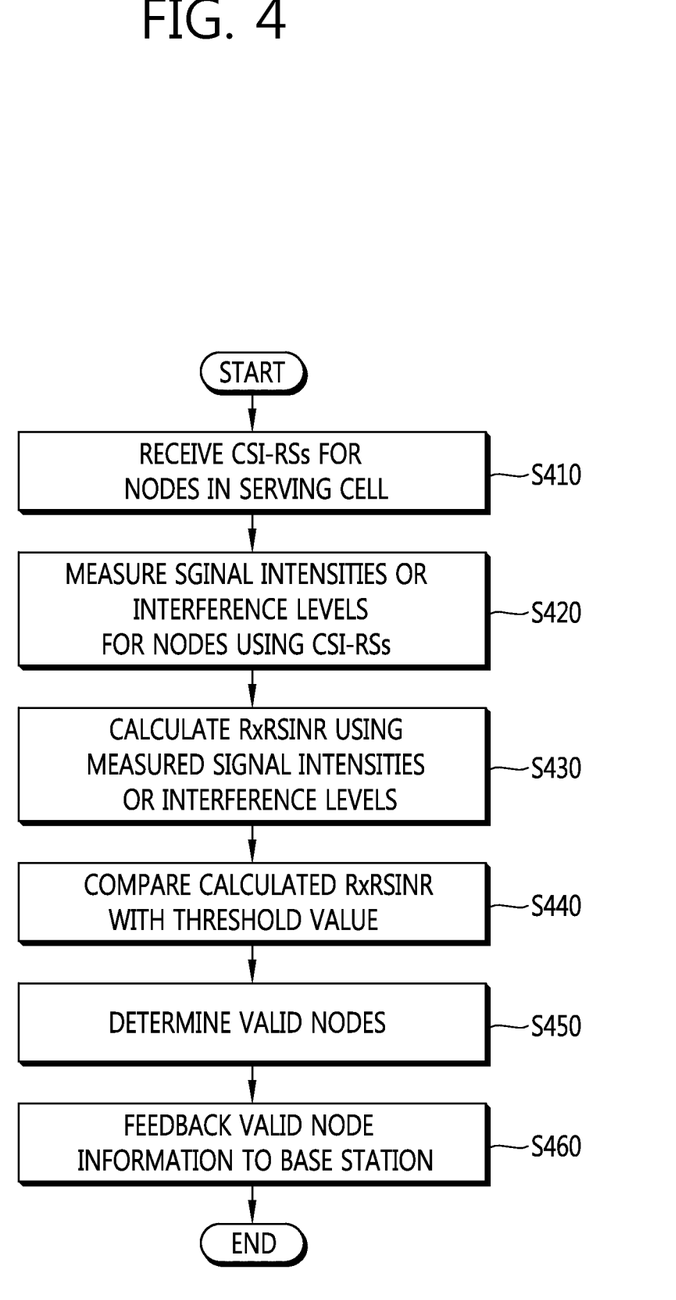
FIG. 4 is a flowchart illustrating a method of selecting valid nodes according to a second embodiment of the present invention.

FIG. 4 is a flowchart illustrating a method of selecting valid nodes according to a second embodiment of the present invention.

Since S410 and S420 are the same as S310 and S320, description of the same parts is omitted and only different parts will be described.

In the DMNS, the terminal calculates the RxRSINR based on the signal intensities or the interference levels measured for the nodes in the serving cell S430.

The RxRSINR as a new UE measurement capability may be defined as illustrated in EQUATION 11.

$$RxRSINR = \frac{\text{sum of } RSRPs \text{ of selected nodes in a cell}}{\text{interference of nodes that are not selected in a cell} + \text{inter-cell interference and stream noise}}$$ [EQUATION 11]

That is, the RxRSINR is defined as a ratio of interference of non-selected nodes in a cell and inter-cell interference and stream noise to the sum of the RSRPs of selected nodes in the cell. In the EQUATION 11, measurement of a numerator and a denominator is performed on a set of the same resource blocks.

wherein, RxRSINR may be calculated by EQUATIONS 12 and 13.

$$RxRSINR_\Omega[dB] = \frac{\sum_{i \in \Omega} P_i}{\sum_{i \notin \Omega} P_i + NI}$$ [EQUATION 12]

wherein, $P_i$ represents CSI-RSRPs for the nodes in the serving cell, $\Omega$ represents a sub-set of the nodes in the serving cell, and NI represents inter-cell interference and stream noise.

$$RxRSINR_\Omega[dB] = \frac{\sum_{i \in \Omega} P_i}{S - \sum_{i \in \Omega} P_i}$$ [EQUATION 13]

wherein, $P_i$ represents CSI-RSRPs for the nodes in the serving cell, $\Omega$ represents a sub-set of the nodes in the serving cell, and S represents CSI-RSSIs in the serving cell.

In addition, in the RxRSINR, the EQUATION 12 may be expressed as the EQUATION 14 and the EQUATION 13 may be expressed as the EQUATION 15 for a terminal having a low mobility speed and a terminal that supports a closed-loop MIMO operation.

$$RxRSINR_\Omega[dB] = \frac{\left(\sum_{i \in \Omega} \sqrt{P_i}\right)^2}{\sum_{i \notin k} P_i + NI}$$ [EQUATION 14]

$$RxRSINR_\Omega[dB] = \frac{\left(\sum_{i \in \Omega} \sqrt{P_i}\right)^2}{S - \left(\sum_{i \in \Omega} \sqrt{P_i}\right)^2}$$ [EQUATION 15]

wherein, in the EQUATIONS 13 and 15, the CSI-RSSI may be expressed as RSSI.

In addition, in the EQUATIONS 12 and 14, the noise and inter-cell interference NI may be calculated through one of the following methods (1) to (4) using the RSRP, the RSRQ, and the RSSI.

$$NI = \frac{N \cdot RSRP_{serving-cell}}{RSRQ_{serving-cell}} - RSRQ_{serving-cell}$$ Method (1)

Method (2)

NI represents the sum of measured RSRPs of other cells than the serving cell.

Method (3)

$$NI = RSSI_{serving-cell} - RSRP_{serving-cell}$$

wherein, $RSRP_{serving-cell}$ represents RSRP measured using a cell-specific reference signal $R_0$ of the serving cell and $RSSI_{serving-cell}$ represents RSSI measured for an OFDM symbol including the cell-specific reference signal of the serving cell. In addition, the $RSRP_{serving-cell}$ may be measured using the $R_1$ when $R_1$ other than $R_0$ may be used.

Method (4)

NI represents a linear average of received power for a CSI-RS in which power is 0.

In addition, the RSRP, the RSRQ, and the RSSI in the methods (1) to (4) may be expressed as CSI-RSRP, CSI-RSRQ, and CSI-RSSI, respectively.

Then, the terminal determines valid nodes that may be received by the terminal or that are preferred by the terminal using the RxRSINR calculated in the above through the methods 1 and 2 S440 and S450.

Method 1

In a method 1, valid nodes are determined by comparing the RxRSINR calculated in each of the nodes of the serving cell with a threshold value.

That is, the terminal determines nodes corresponding to RxRSINR$_\Omega$ that satisfies EQUATION 16 as the valid nodes.

$$\text{threshold}_0 \leq \text{RxRSINR}_\Omega \leq \text{threshold}_1 \quad [\text{EQUATION 16}]$$

Method 2

In a case where a calculated RxRSINR of an ith node among the nodes in the serving cell is represented as $P_i$, when the total number of nodes in the serving cell is represented as N, calculates RxRSINRs of the nodes may be aligned as $P_1 \geq P_2 \geq \ldots \geq P_N$ a descending order. In addition, $N_s(k)$ as a candidate set may be represented as $N_s(k)=\{P_1, P_2, \ldots, P_k\}$.

Based on the defined content, in the method 2, nodes corresponding to $N_s(1)$ are selected and nodes corresponding to $P_k$ that satisfies EQUATION 17 are added as valid nodes to determine the valid nodes. Here, the EQUATION 17 is established when k≥2.

$$\text{RxRSINR}_{N_s(k)} - \text{RxRSINR}_{N_s(k-1)} \geq \text{threshold}_2 \quad [\text{EQUATION 17}]$$

As an example of the method of determining the valid nodes according to the method 2, when the number of nodes in the serving cell is 2, the terminal selects a node corresponding to $N_s(1)$ and, when an RxSINR for $N_s(2)-N_s(1)$ that satisfies the EQUATION 17 is larger than a threshold value threshold2, a node corresponding to $P_2$ in $N_s(2)$ is added as a valid node. Therefore, the terminal determines nodes corresponding to $P_1$ and $P_2$ as valid nodes.

Here, the threshold values threshold$_0$, threshold$_1$, and threshold$_2$ may be values transmitted from the BS or a network to the terminal or may be predetermined values.

Then, the terminal may feedback information on the determined valid nodes, that is, valid node information to the BS S460.

The valid node information further includes valid node number information that represents the number of determined valid nodes. Here, the number of valid nodes may be a value in a uniform range as follows. In addition, the uniform range may be a predetermined value or a value transmitted by the BS.

That is, the number N of valid nodes selected by the terminal to be fed back to the BS must satisfy the following conditions.

$$N_1 \leq N \leq N_2$$

wherein, $N_1$ and $N_2$ represent a lower bound and an upper bound of the number of nodes that may be selected by the terminals, respectively.

In addition, $N_1$ may be previously defined to be applied without being additionally transmitted by the BS or $N_1$ and $N_2$ may be previously defined as the same value and only one value may be provided to the terminal.

In addition, the valid node information includes at least one of physical node indices, logic node indices (node indices for the signal intensities or the interference levels aligned in a descending order), CSI-RS port numbers, CSI-RSRP, CSI-RSRQ, RxRSINR, and CSI-RS configurations, a CSI-RS sub-frame configuration, and a cell ID.

The CSI-RSRP or the CSI-RSRQ may be CSI-RSRP or CSI-RSRQ measured in each of the nodes in the serving cell or may be an average CSI-RSRP or CSI-RSRQ for selected nodes.

Figure 5:
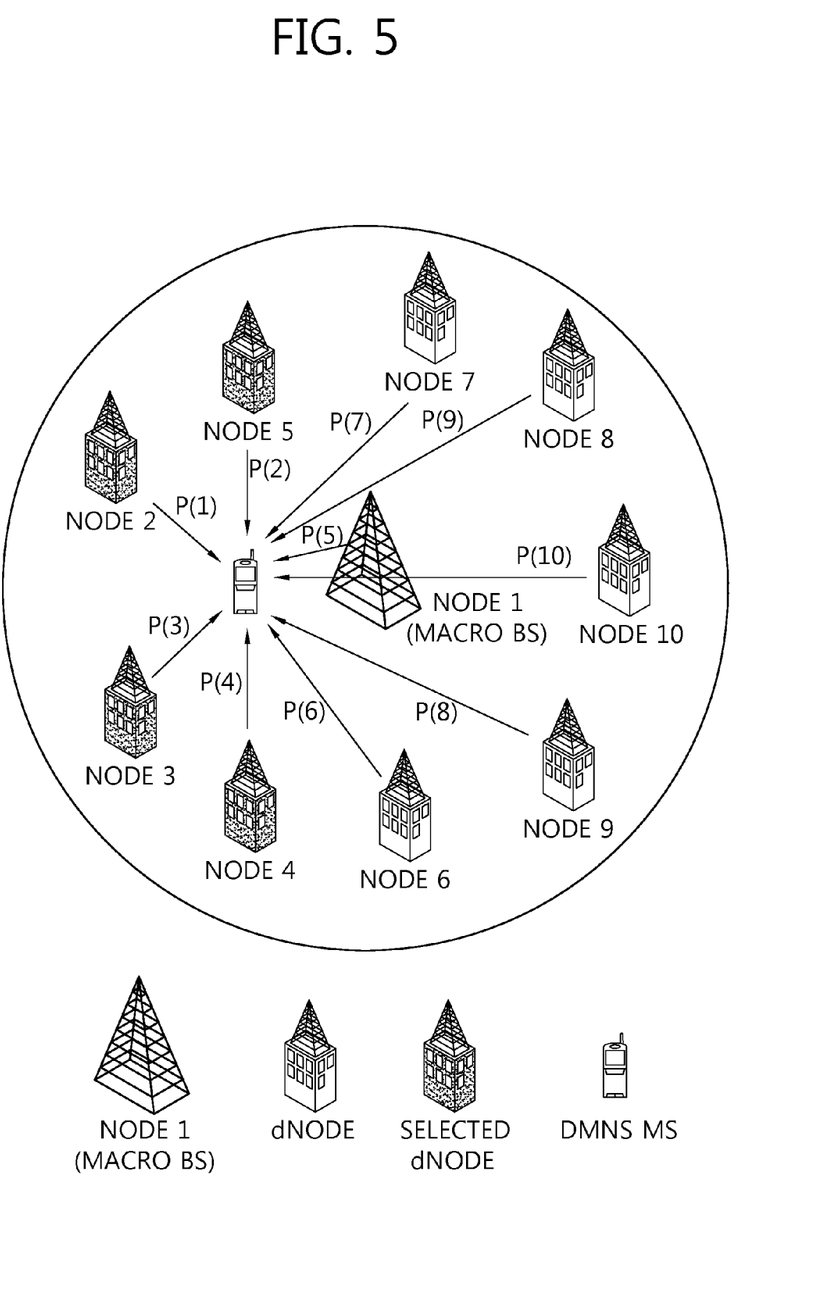
FIG. 5 is a conceptual diagram illustrating valid nodes determined according to first and second embodiments of the present invention.

FIG. 5 is a conceptual diagram illustrating valid nodes determined according to first and second embodiments of the present invention.

Referring to FIG. 5, in a DMNS configured by ten nodes having nine distributed nodes in coverage of a macro BS, a terminal selects four valid nodes. That is, the terminal selects valid nodes that are preferred by the terminal or that may be received by the terminal using signal intensities or interference levels measured by the ten nodes ($P_1, \ldots, P_{10}$).

Figure 6:
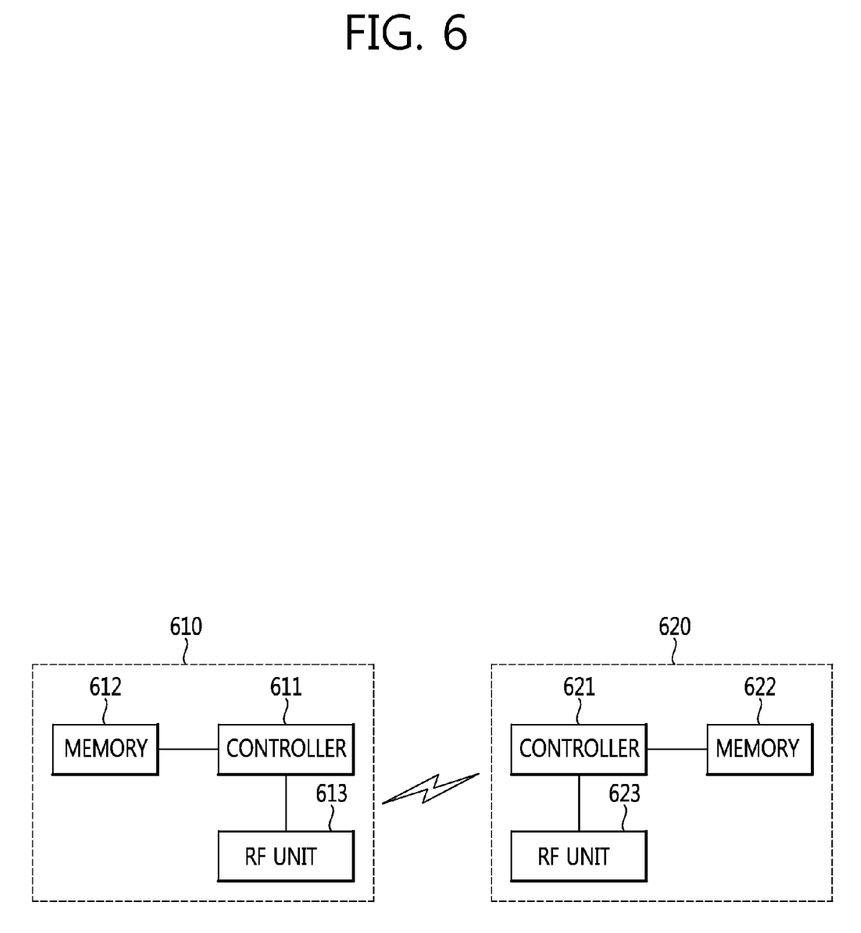
FIG. 6 is an internal block diagram illustrating a terminal and a base station (BS) according to an embodiment of the present invention.

FIG. 6 is an internal block diagram illustrating a terminal and a BS according to an embodiment of the present invention. A BS 610 includes a controller 611, a memory 612, and a radio frequency (RF) unit 613. The controller 611 realizes suggested functions, processes, and/or methods. Layers of a wireless interface protocol may be realized by the controller 611. The controller 611 is configured to perform operations according to the embodiment of the present invention.

The memory 612 connected to the controller 611 stores a protocol or a parameter for operating a DMNS.

The RF unit 613 connected to the controller 611 transmits and/or receives a radio signal. A terminal 620 includes a controller 621, a memory 622, and an RF unit 623.

The controller 621 realizes suggested functions, processes, and/or methods. Layers of a wireless interface protocol may be realized by the controller 621. The controller 621 is configured to perform operations according to the embodiment of the present invention.

The memory 622 connected to the controller 621 stores a protocol or a parameter for operating a DMNS. The RF unit 623 connected to the controller 621 transmits and/or receives a radio signal.

The controllers 611 and 621 may include an application-specific integrated circuit (ASIC), another chipset, a logic circuit, and/or a data processing apparatus. The memories 612 and 622 may include a read-only memory (ROM), a random access memory (RAM), a flash memory, a memory card, a storage medium, and/or another storage apparatus. The RF units 613 and 623 may include a baseband circuit for processing a radio signal. When the embodiments are realized by software, the above-described methods may be realized by modules (processes and functions) for performing the above functions. The modules may be stored in the memories 612 and 622 and may be executed by the controllers 611 and 621. The memories 612 and 622 may be in or outside the controllers 611 and 621 and may be connected to the controllers 611 and 621 by various well-known units.

Although embodiments of the present invention have been described, it may be understood by those skilled in the art that various modifications or variations may be made to the present invention without departing from the scope of the present invention.

The invention claimed is:

1. A method of selecting nodes in a serving cell in a distributed multi-node system (DMNS), the method comprising:
   receiving, by a radio frequency (RF) unit, channel state information reference signals (CSI-RS) for nodes in the serving cell from a base station;
   measuring, by a controller, signal intensities or interference levels for the nodes through the received CSI-RSs;
   determining, by the controller, at least one valid node among the nodes based on the measurement results;
   feeding back valid node information on the determined valid nodes or the measurement results to the base station;
   wherein the signal intensities or the interference levels are expressed as one of channel state information reference signal received power (CSI-RSRP), channel state information reference signal received quality (CSI-RSRQ), and channel state information reference signal's signal intensity (CSI-RSSI), wherein determining the valid nodes comprises calculating a received reference signal to interference plus noise ratio (RxRSINR) based on the signal intensities or the interference levels measured for the nodes, and wherein the RxRSINR is defined as the sum of reference signal received powers of selected nodes in the serving cell and the sum of interference of non-selected nodes in the serving cell and stream noise.

2. The method of claim 1, wherein:

the valid node information further comprises valid node number information that represents the number of determined valid nodes; and the number of valid nodes is a value in a uniform range.

3. The method of claim 2, wherein:

the uniform range is between a lower bound and an upper bound of the number of valid nodes that may be served to a terminal; and the lower bound and the upper bound are values transmitted by the base station or previously defined values.

4. The method of claim 1, wherein the valid node information comprises at least one of: physical node indices, logic node indices, CSI-RS port numbers, CSI-RSRP, CSI-RSRQ, and CSI-RS configurations, a CSI-RS sub-frame configuration, and a cell ID.

5. The method of claim 1, wherein the RxRSINR is calculated based on a combination of the nodes in the serving cell.

6. The method of claim 1, wherein the RxRSINR is calculated by EQUATION D or E $$RxRSINR_\Omega[\text{dB}] = \frac{\sum_{i \in \Omega} P_i}{\sum_{i \notin k} P_i + NI} \qquad \text{[EQUATION D]}$$

$$RxRSINR_\Omega[\text{dB}] = \frac{\sum_{i \in \Omega} P_i}{S - \sum_{i \in \Omega} P_i} \qquad \text{[EQUATION E]}$$

where:

$P_i$ represents CSI-RSRP for nodes in a serving cell, $\Omega$ represents a sub-set of the nodes in the serving cell, NI represents noise and inter-cell interference, and S represents CSI-RSSI in the serving cell.

7. The method of claim 5, wherein:

in determining the valid nodes, nodes in which the calculated RxRSINR belongs to a uniform range are determined as the valid nodes; and the uniform range is between a lower bound and an upper bound transmitted by the base station or a network.

8. The method of claim 5, wherein, in determining the valid nodes, a node corresponding to $N_S(1)$ is selected and a node corresponding to $P_k$ that satisfies EQUATION F is added as a valid node to determine at least one valid node $$RxRSINR_{N_S(k)} - RxRSINR_{N_S(k-1)} \geq \text{threshold}_2 \qquad \text{[EQUATION F]}$$

where:

$P_k$ represents an RxRSINR of a kth node when calculated RxRSINRs of the nodes are aligned in a descending order, $N_S(k)$ represents a node set corresponding to $P_1$ to $P_k$, and the EQUATION F satisfies k≥2.

9. A terminal for selecting nodes in a serving cell in a distributed multi-node system (DMNS), the terminal comprising:

a radio frequency (RF) unit for transmitting a radio signal to and receiving a radio signal from an outside; and a controller connected to the RF unit, the controller being configured to:

control the RF unit to receive channel state information reference signals (CSI-RS) for the nodes in the serving cell from a base station;

measure signal intensities or interference levels for the nodes through the received CSI-RSs;

perform control so that at least one valid node is determined among the nodes; and feeding back valid node information on the determined valid nodes or the measurement results to the base station, wherein the signal intensities or the interference levels are expressed as one of: channel state information reference signal received power (CSI-RSRP), channel state information reference signal received quality (CSI-RSRQ), and channel state information reference signal's signal intensity (CSI-RSSI), wherein determining the valid nodes comprises calculating a received reference signal to interference plus noise ratio (RxRSINR) based on the signal intensities or the interference levels measured for the nodes, and wherein the RxRSINR is defined as the sum of reference signal received powers of selected nodes in the serving cell and the sum of interference of non-selected nodes in the serving cell and stream noise.

\* \* \* \* \*